United States Patent Office 3,257,845
Patented June 28, 1966

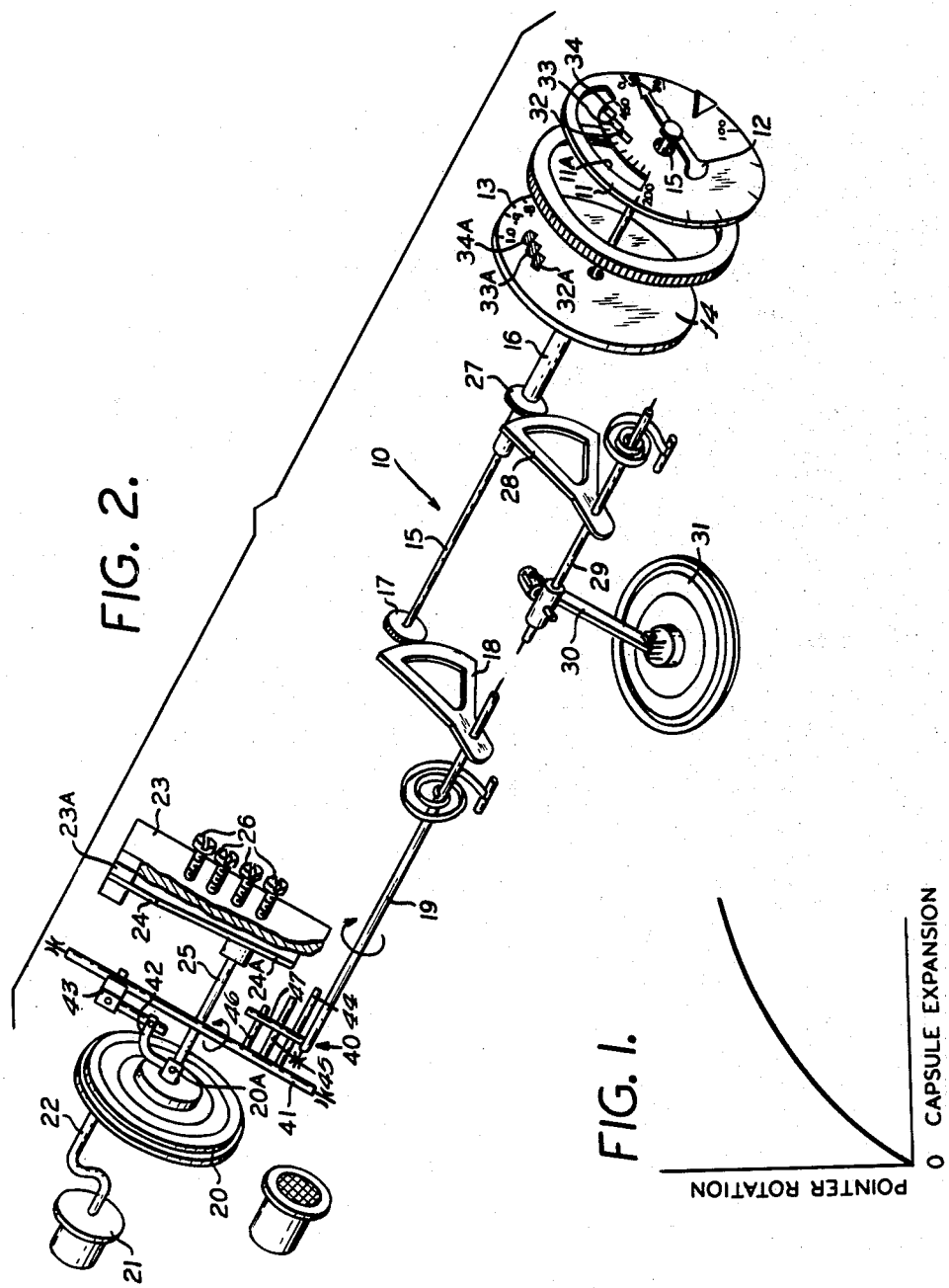

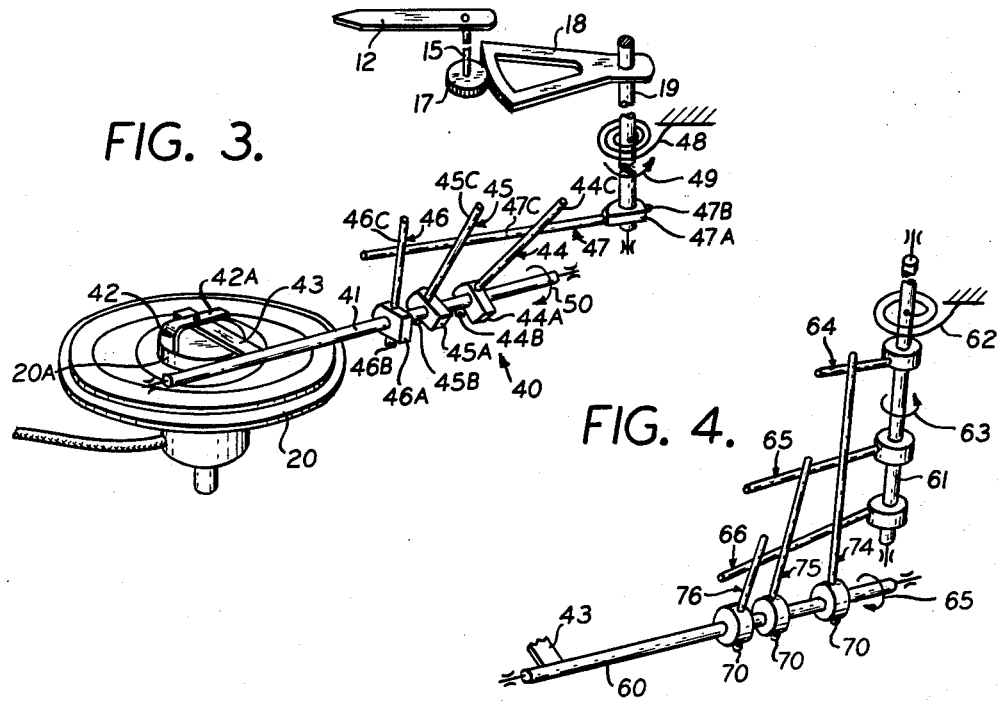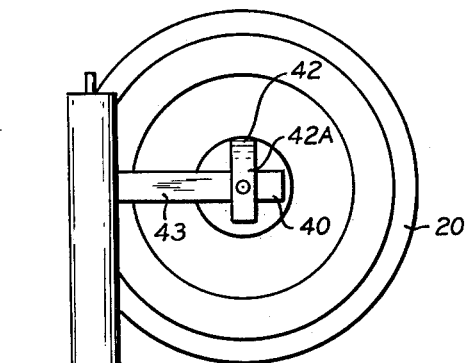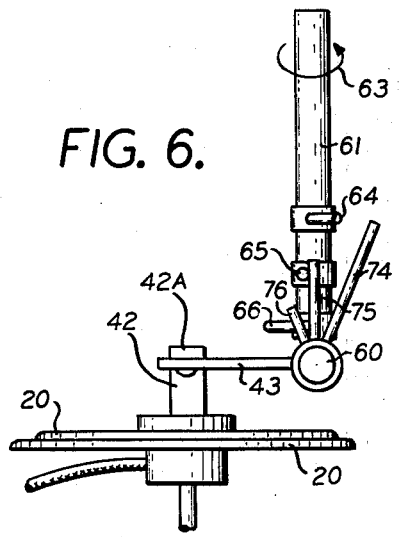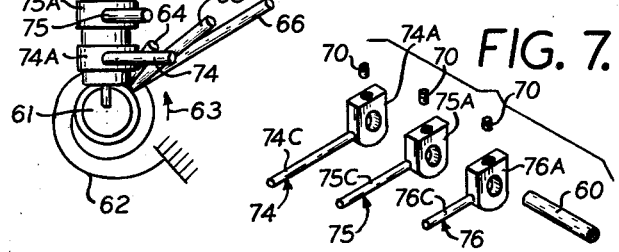
INVENTORS
JOHN H. ANDRESEN, JR.
EMIL P. KNAPP
BY
ATTORNEYS.

1

3,257,845
AIRSPEED INDICATOR HAVING NON-UNIFORM SCALE
John H. Andresen, Jr., Hewitt, N.J., and Emil P. Knapp, Floral Park, N.Y., assignors to Astek Instrument Corp., Armonk, N.Y., a corporation of New York
Filed Jan. 30, 1963, Ser. No. 255,053
3 Claims. (Cl. 73—182)

This invention relates generally to a dial type instrument, and more specifically to an airspeed indicator having an improved drive means for effecting a pointer movement which is a non-linear function of the airspeed indicator motive means movement.

In airspeed indicators for use in aircraft and the like, it is oftentimes desirable to have an airspeed pointer movement which is a non-linear function of the indicator's motive means motion. This is particularly true for airspeed indicators adapted for use in high-speed aircraft. In such aircraft it is desirable that the airspeed indicator be read closely and accurately in the lower speed ranges as such speeds are often critical in landing and taking off. For this reason it is desirable that the readings of the airspeed indicator be expanded in the lower speed ranges and compressed in the higher speed ranges to the end that a substantially constant percentage of readability of the airspeed indicator is had for any given speed range. To attain this end, the pointer must have imparted thereto a movement which is a non-linear function of its motive means wherein the motion of the pointer will be faster in the lower speed ranges where the readings are expanded and progressively slower in the higher speed ranges where the readings are compressed.

Heretofore the known mechanical means for attaining this desired end result consisted of relatively complicated structures, as for examples, crank and lever assemblies, non-linear gearing arrangements, restraining springs with calibrating screws, forks and pin assemblies, and/or combinations of these systems. As a result such prior known assemblies or structures utilized for imparting a non-linear movement to an airspeed pointer were relatively difficult to fabricate and assemble, costly to manufacture, and difficult, if not impossible to adjust once installed in the instrument. Consequently, adjustments to compensate adequately for machine tolerances could not be readily made with the prior known structures.

Further, some known structures produced forces which require the use of relatively heavy structural members. Also the prior known constructions were not capable of producing an optimum smooth pointer movement as a non-linear function of the instrument's motive means.

Therefore, an object of this invention is to impart to the pointer of an airspeed indicator a smooth movement which is a non-linear function of its motive means movement and which movement can be readily adjusted.

Another object is to provide an improved drive means for imparting a movement to the instrument pointer which is a non-linear function of the instrument's motive means in a manner which will induce a negligible amount of friction in the system, and minimize or obviate the need for relatively heavy structural members heretofore required in such instruments.

Still another object is to provide an airspeed indicator which is relatively simple in construction, relatively inexpensive to fabricate, and positive in operation.

The above objects and other features and advantages of this invention are attained by an airspeed indicator provided with a face dial having a series of airspeed designations thereon operatively associated with a pointer means, the movement of which is responsive to the expansion and contraction of an airspeed capsule. In accordance with this invention an improved driving means is operatively interposed between the capsule and the pointer means so as to impart to the latter a movement which is a non-linear function of the capsule movement. Essentially the drive means comprises a pair of rotatably journaled shaft means which have their respective longitudinal axes angularly disposed relative one another, and preferably in the same plane. Independent means are provided for connecting each of the shaft means in driving relationship with the capsule and the pointer means, respectively. The respective shaft means in turn are connected in driving relationship to each other by complementary smooth levers or rods which are connected to and extend radially of the respective shaft means and which levers are adapted to be both angularly and axially adjusted along their respective shaft means. The arrangement is such that at least one radially extending smooth rod or lever is connected to one of the shaft means and two or more levers are connected to extend radially from the other shaft means. A spring means operating on one of the shaft means is provided to normally urge the respective complementary levers into engaging or driving relationship with respect to one another, the arrangement being such that the lever or levers connected to the spring urged shaft means will follow the movement of the respective levers connected to the other shaft in accordance with the expansion and contraction of the capsule. Thus the shaft means following the movement of the shaft means, which is directly connected to the capsule, will have imparted thereto a movement which is discretely changed as the lever connected to the following shaft progressively engages or follows the respective levers connected to the capsule driven shaft means, and which movement is transmitted to the pointer means so that the latter will have imparted thereto with a minimum of friction a smooth operating movement which constitutes a non-linear function of the capsule movement. By adjusting the respective levers axially and/or angularly about their respective shaft means, a change or, if desired, a series of changes in the speed ratio of such movement can be readily attained.

Therefore a feature of this invention resides in the provision of a relatively simple driving connection between the pointer means and the capsule comprising cooperating radially extending complementary lever arms connected to the capsule driven shaft and the pointer actuating or following shafts, respectively, for imparting to the pointer a movement which is a smooth non-linear function of the capsule movement.

Another feature resides in the provision that the interengagement of the respective lever arms during operation of the airspeed indicator imposes a minimum or a negligible amount of friction on the system.

Another feature resides in the provision that the respective lever arms are mounted on their respective shafts so as to be axially and angularly adjusted with respect to one another along their respective connected shaft means so as to vary the speed ratio of the non-linear movement.

Still another feature resides in the provision wherein the complementary lever arms effect discrete changes in the movement of the pointer means at the intervals wherein the corresponding levers of the respective shafts progressively and successively engage one another.

Other features and advantages will become more readily apparent when considered in view of the drawings in which:

FIG. 1 is a graphic representation of a typical curve illustrating shaft rotation versus capsule expansion wherein the former constitutes a non-linear function of the latter;

FIG. 2 is an exploded perspective view of an airspeed indicator embodying the instant invention;

FIG. 3 is a perspective view illustrating an enlarged detail of the drive means embodied in FIG. 2;

FIG. 4 is a detail perspective view of a modification of the drive means of FIGS. 2 and 3;

FIG. 5 is a plan view of the modification illustrated in FIG. 4 illustrating the relationship of the drive means with respect to the capsule;

FIG. 6 is a side elevation view of FIG. 5; and

FIG. 7 is an exploded perspective view illustrating the manner in which the respective lever arms are connected to their respective shafts.

Referring to the drawings, there is illustrated a combined Mach and airspeed indicator. However, it will be understood that the instant invention is equally applicable for use on a simple airspeed indicator, i.e., one not having a Mach sub-dial.

Essentially the illustrated airspeed indicator 10 of FIG. 2 comprises a fixed airspeed dial 11 which is adapted to be enclosed in a suitable casing or housing, which is not shown. The face of the dial 11 has located thereon suitable airspeed designations. In the illustrated embodiment the airspeed designations are scaled to read from, for example, 0 to 450 knots, the range of which is constructed to cover approximately 340 degrees of rotation of the instrument single pointer 12. Actually, other ranges of speed designations or indices may be employed without departing from the spirit or scope of this invention. Preferably the airspeed designations or markings on the dial are matte white on dull black background, and the non-essential markings are made black and black to prevent unnecessary dial color.

As shown the fixed dial 11 is provided with an arcuate cutout portion to define a window 11A for viewing the Mach number scale 13 located on the Mach sub-dial 14 coaxially disposed with respect to the fixed dial 12. The arcuate cutout or window 11A is disposed along the outer peripheral portion of the fixed dial adjacent the higher range of speed marking. For example, the window 11A extends between the 200 and 450 knot designations.

In the illustrated embodiment the scale of the airspeed designations on dial 11 is expanded in the 60 to 200 knot range so as to provide a readability of one knot, and compressed between the 200 to 450 knot range. The Mach number scale on the sub-dial, which is of prime interest at the higher speeds, is graduated every .01 Mach and rendered easily readable to .005 Mach. The Mach scale designations are also preferably in matte white on dull black background.

Operatively associated with the respective dials is a pointer means which comprises a pointer 12 fixed to a pointer shaft 15 which has its axis of shaft rotation concentrically disposed with respect to the fixed dial 11 and its associated cutout portion or window 11A. The pointer shaft 15 extends through the center of the fixed dial 11 and through a sleeve 16 to which the sub-dial 13 is fixed. At a point adjacent the end of the pointer shaft 15 there is fixed a pinion 17 which is arranged to mesh with a gear sector 18 fixed to a following or actuating shaft 19 which constitutes an element of the improved drive means of the instant invention, as will be hereinafter described. The following or actuating shaft 19 in turn is operatively connected in driving relationship to a pressure actuated capsule 20 which functions as the motive means for the pointer. Accordingly, the interior of the capsule 20 connects to a Pitot pressure source 21 by a line 22, while exteriorly, the capsule is subjected to the ambient air pressure and thus renders the capsule responsive to airspeed.

If desired, means for calibrating the expansion and contraction of the airspeed capsule 20 is provided. This means comprises a calibrating screw block 23, which is fixed in the instrument housing, and it is provided with an offset portion 23A to which a calibrating spring is connected in a cantilever fashion. The free end 24A of the spring 24 in turn is urged against a rod 25 bearing on the centerpiece 20A of the capsule 20. A series of screws 26 threaded to the block 23 are provided for adjustably controlling the degree of expansion and contraction of the airspeed capsule.

The Mach portion of the indicator comprises the sub-dial 13 containing the Mach indication. The sub-dial 13 is fixed to the hollow shaft or sleeve 16. Accordingly, the sleeve 16 is mounted so as to be rendered rotatably relative to the pointer shaft 15 extending therethrough. A pinion gear 27 is fixed to the shaft 16 and it in turn meshes with a gear sector 28 which is fixed to a rotatably journaled shaft 29. Shaft 29 in turn is operatively connected through a connecting linkage 30 to a pressure operated drive mechanism which is actuated by the expansion and contraction of a pressure responsive capsule 31 due to changes of ambient air pressure. Thus the drive mechanism of the sub-dial 13 is similar to that of an altimeter. Its linkage connection 30 is such that it will rotate the sub-dial 13 at an angular rate which varies linearly with the logarithm of the static pressure; and a restoring spring 32 is operatively associated with shaft 29.

The airspeed dial 12 and the sub-dial 13 are so selected that a single pointer indicates airspeed on the inner scale of the fixed dial, and at the same time the Mach number on the scale of the sub-dial which is rendered visible through the cutout portion or window 11A of the fixed dial 11.

For aircraft in which the maximum indicated airspeed varies with altitude below the point where the mach limitation is reached, means are provided for indicating the limiting variable allowable maximum airspeeds by an indicating mark which will appear as a moving, short, readily noticeable line on the face of the airspeed dial 11. The arrangement is such that the limiting indicating line will point to a different maximum allowable airspeed as the altitude of the aircraft varies; and thereby enables the pilot to realize or approach, but not exceed, the theoretical maximum safe airspeed of a given aircraft for a given altitude.

This is attained by providing the fixed dial 11 with a plurality of circumferentially and radially spaced elongated cutouts or windows 32, 33 and 34, each of which points to a progressively higher airspeed designation. Each cutout or window 32 to 34 is thus spaced a different radial distance from the center of the face dial 11. Behind the respective cutouts or windows 32, 33 and 34 there is printed on the sub dial, preferably in a color of contrasting red on a black background of the sub-dial, a series of arcs or bands 32A, 33A and 34A based on radii corresponding respectively to the radii of the windows 32, 33 and 34. Thus the colored arcs or bands 32A, 33A and 34A are so located that at the proper altitude, one of the appropriate arcs or bands will appear visible on the face 11 of the fixed dial through its corresponding cutouts or windows 32, 33 and 34. For a more detailed description of this warning feature, reference is made to a co-pending application, Ser. No. 157,513, filed December 6, 1961, now Patent No. 3,205,708, issued Sept. 14, 1965.

In accordance with this invention, an improved drive means 40 operatively connects the capsule 20 in driving relationship to the pointer means so that the pointer 12 will have a movement that is a non-linear function of the capsule movement. The drive means include a pair of shafts, namely, a capsule driven shaft 41 and the following shaft 19. The respective shafts 41 and 19 are rotatably journaled within the housing of the airspeed indicator, and they have their longitudinal axes angularly disposed with respect to one another, preferably in the same plane. Means operatively connect shaft 41 into driving relationship to the capsule 20. As shown, this means comprises an L-shaped bracket 42 which is fixed to the centerpiece 20A of the capsule. Bracket 42 has a leg portion 42A spaced above the capsule and it is adapted to engage a lug 43 extending laterally from the capsule driven shaft 41, the arrangement being such that as the capsule 20 expands and contracts, bracket 42 connected to the diaphragm portion of the capsule and movable therewith will cause lug 43, extending laterally of shaft 41 to follow the capsule movement, as will be hereinafter described, thus permitting the capsule driven shaft to rotate in one direction or the other according to the respective movements of the capsule 20. Fixed to the capsule shaft 41 in axially spaced relationship thereon are a plurality of lever arms, i.e., two or more, each extending radially of the shaft whereby each is also rendered readily angularly and axially adjustable with respect to one another. In the illustrated embodiment three angularly disposed levers 44, 45 and 46 are connected to the capsule shaft.

As shown in FIG. 3, each of the levers 44, 45 and 46 include a collar portion 44A, 45A and 46A, respectively, and each is provided with a bore therethrough for receiving the capsule shaft 41. The collars of the respective levers are fixed to the shaft 41 in their adjusted position by a set screw 44B, 45B and 46B. Connected to each of the collars 44A, 45A and 46A is a smooth lever arm or rod 44C, 45C and 46C. According to this invention the levers 44, 45 and 46 are axially spaced along the capsule shaft 41 and angularly disposed relative to one another. Thus the angle formed between one of the lever rods and each of the other rods varies.

As shown in FIG. 3, the following shaft 19 has a lever 47 connected thereto which extends radially therefrom. In the form of the invention disclosed in FIG. 3, only one lever 47 is connected to the following shaft 19. The component parts of lever 47 are similar to those of levers, 44, 45 or 46. It comprises a collar 47A, a set screw 47B by which it is adjustably fixed to shaft 19, and a smooth lever arm or rod 47C. The lever 47 is axially disposed along shaft 19 so that it will engage each of the respective levers 44, 45 or 46 connected to the capsule shaft upon relative rotation of shafts 41 and 19. The angular relationship between levers 44 to 46 and 47 is such that lever 47 will successively engage each of levers 44 to 46.

To maintain the respective levers in contact or driving relationship, a spring means 48 is disposed to operate on shaft 19. As shown, spring means 48 comprises a coil spring which normally urges shaft 19 and the lever 47 connected thereto in a clockwise direction as viewed in FIG. 3, and, as indicated by arrow 49. Thus it will be noted that the smooth arm 47C of lever 47 will normally be urged against one of the lever arms 44C, 45C or 46C connected to the capsule driven shaft 41. Because spring 48 urges the rod 47 in a clockwise direction, shaft 19 and the lever connected thereto will follow the movement of the capsule driven shaft 41 and its respective levers 44, 45 and 46 upon the expansion and contraction of the capsule 20 in response to airspeed.

With the arrangement described it will be noted that the capsule 20 serves as the motive means which imparts a movement or angular rotation to the capsule shaft 41 and in turn to the following shaft 19. However, the rate at which the following shaft 19 moves relative to the capsule shaft 41 is dependent upon which of the respective levers 44, 45 or 46 is engaging lever 47 at a particular moment. Referring to FIG. 3, the operation of the drive means 40 described is as follows:

The capsule 20, on increasing airspeeds, will drive the capsule shaft 41 in the direction indicated by arrow 50 whereby spring 48 permits the following shaft 19 to follow in the direction of arrow 49. Therefore lever 47 will first contact lever 44, which is furtherest removed from the capsule. As airspeed increases lever 44 will rotate away from lever 47 causing lever 47 to make contact with the middle lever 45 and then progressively with lever 46 as lever 45 rotates away therefrom due to the relative angular disposition of the respective levers. As a result the arrangement is such that when lever 47 is contacting lever 44, the angular rotation imparted to the pointer 12 will be greatest. The motion of the pointer 12 is then progressively decreased as lever 47 successively engages the second lever 45 and the third lever 46. Upon a decrease in airspeed the movement of the respective levers 44 to 46 and 47 is reversed. It will be appreciated that with increasing airspeed the capsule overcomes the force of spring 48. With the arrangement described a minimum of frictional forces are induced on the system as there exists a minimum of contacting surfaces between the respective levers 44, 45, 46 and 47, which constitutes the drive by which the movement of the capsule 20 is transmitted to the following shaft 19 and in turn the pointer 12. Further, the progressive engagement and disengagement between the respective levers 44, 45, 46 and 47 is smoothly and effortlessly accomplished. Thus the transition to and from one speed ratio to another as lever 47 progressively engages each of the respective levers 44, 45 and 46 is discretely attained.

FIGS. 4 to 7 illustrate a slightly modified embodiment of the invention. In this form of the invention the general arrangement of the airspeed indicator is the same as hereinbefore described with respect to FIGS. 2 and 3, except that three levers are connected to each the capsule driven shaft 60 and the following shaft 61.

Referring more specifically to FIGS. 4 to 6, it will be noted that capsule shaft 60 and its following shaft 61 are angularly disposed and preferably in the same plane. See FIG. 5. Spring 62 operates on shaft 61 so as to normally bias shaft 61 in the direction indicated by arrow 63. Accordingly, three levers 64, 65, and 66 are connected to the following shaft 61 and corresponding complementary levers 74, 75 and 76 are connected to the capsule driven shaft 60. Each of the levers connected to the respective shafts 60 and 61 comprise a collar portion, a set screw by which the respective collars are axially and angularly fixed along its respective shaft and a lever rod or arm.

In FIG. 7, the respective levers 74, 75 and 76 are illustrated in an exploded view. It will be readily apparent that respective collar portions 74A, 75A and 76A thereof are adapted to receive the capsule shaft 60 and are fixed in adjusted position thereto by set screws 70. Connected to each of the collars 74A, 75A and 76A are rods 74C, 75C and 76C extending therefrom.

It will be noted in FIGS. 4 to 6 that the levers 64, 65, and 66 connected to shaft 61 are of variable length and each angularly disposed with respect to each other a relative angular amount. The levers 74, 75 and 76 connected to capsule shaft 60 are similarly constructed and arranged along shaft 61. In operation, the embodiment of the invention of FIGS. 4 to 6 is similar to that hereinbefore described except that the modified embodiment gives a greater range of speed ratio change than is possible by the embodiment of FIGS. 1 to 3. That is, at the lower airspeeds lever 64 will first engage lever 74 causing the pointer to attain its greatest rate of movement. Then the capsule on increasing airspeed will cause the shaft 60 and lever 74 connected thereto to move in the direction indicated by arrow 65 so that the intermediate size lever 65 is brought into engagement with lever 75 as levers 64 and 74 move out of engagement. The relative relationship of levers 65 and 75 is such that the movement of the pointer is slowed down. As lever 75 is moved out of contact from lever 65 on further increasing airspeed, lever 66 is brought into engagement with lever 76. Thus the relationship of the levers 66 and 76 is such that the ratio or rate of pointer movement is further decreased. On decreasing airspeed the co-action between the respective levers is reversed.

While the embodiment of FIGS. 4 to 6 illustrates three levers connected to each of the capsule driven shaft 60 and follower shaft 61, it will be understood that any combination of levers may be used without departing from the scope of the invention. Thus, any number of levers may be placed on either shaft to provide for either more or less frequent ratio changes so as to attain any desired degree of smoothness between input to output curve.

From the foregoing description it will be noted that with the drive means described, the respective angular and axial position of the respective levers can be readily adjusted to establish a desired curve. Thus, the instruments can be individually calibrated with little effort to compensate for manufacturing tolerance, play and wear.

While the instant invention has been disclosed with reference to several embodiments, it is to be appreciated that the invention is not to be taken as limited to all of the details thereof as modifications and variations thereof may be made without departing from the spirit or scope of the invention.

What is claimed is:

1. An airspeed indicator comprising a face dial having airspeed designations thereon, a pointer associated with said dial for pointing to a given designation thereon, a pressure responsive motive means responsive to airspeed, drive means connecting said pointer in driven relationship with said pressure responsive motive means for effecting pointer movement which is a non-linear function of said pressure responsive motive means movement, said drive means including a pair of rotatably mounted shafts having their respective axes angularly disposed in a common plane, means connecting one of said shafts in driven relationship to said pressure responsive motive means, means connecting the other of said shafts in driving relationship to said pointer, a plurality of radially extending levers axially spaced along said one shaft, each of said levers being angularly disposed about said one shaft with respect to one another, at least one lever connected to said other shaft and extending radially therefrom, and spring means normally urging said other shaft so that the lever connected thereto sequentially engages with each of said levers connected to said one shaft whereby said other shaft follows the movement of said one shaft in response to the operation of said pressure responsive motive means.

2. An airspeed indicator comprising:
   (a) a face dial having airspeed designations thereon,
   (b) pointer means including a pointer shaft and pointer connected thereto associated with said face dial for indicating a given airspeed designation thereon,
   (c) an airspeed capsule adapted to expand and contract in response to airspeed,
   (d) drive means interconnected between said capsule and pointer means for effecting a pointer movement which is a non-linear function of the expansion and contraction movement of said capsule,
   (e) said drive means including a rotatably journaled shaft operatively connected to said capsule so as to be rotated in one direction or the other in response to the expansion and contraction thereon in accordance with varying airspeeds,
   (f) a following shaft rotatably journaled and angularly disposed with respect to said capsule shaft in a plane common thereto,
   (g) means connecting said following shaft in driving relationship to said pointer shaft,
   (h) a plurality of radially extending lever arms connected in angularly and axially spaced relationship with respect to one another along said capsule shaft,
   (i) at least one complementary radially extending lever arm connected to said following shaft,
   (j) each of the lever arms on said capsule shaft being adapted to sequentially engage one at a time the lever arm on said following shaft, and
   (k) spring means operating on said following shaft for normally urging said lever arm on said following shaft in driving engagement with lever arms on said capsule shaft whereby said following shaft follows the movement of said capsule shaft as a non-linear function thereof and which non-linear movement is transmitted to said pointer means.

3. An airspeed indicator comprising:
   (a) a face dial having airspeed designations thereon,
   (b) pointer means including a pointer shaft and pointer means including a pointer shaft and pointer connected thereto associated with said face dial for indicating a given airspeed designation thereon,
   (c) an airspeed capsule adapted to expand and contract in response to airspeed,
   (d) drive means interconnected between said capsule and pointer means for effecting a pointer movement which is a non-linear function of the expansion and contraction of said capsule,
   (e) said drive means including:
      (i) a rotatably journaled capsule shaft operatively connected to said capsule so as to be rotated in one direction or the other in response to the expansion and contraction thereof,
      (ii) a following shaft rotatably journaled and angularly disposed with respect to said capsule shaft in a plane common thereto,
      (iii) means connecting said following shaft in driving relationship to said pointer shaft,
      (iv) a plurality of radially extending lever arms connected in axially spaced relationship along said capsule shaft,
      (v) a plurality of corresponding complementary radially extending lever arms connected in axially spaced relationship along said following shaft,
      (vi) the lever arms on said capsule shaft being adapted to sequentially engage the corresponding lever arms on said following shaft, and
      (vii) spring means operating on said following shaft for maintaining said lever arms on said following shaft in driving engagement with arms on said capsule shaft whereby said following shaft is permitted to follow the movement of said capsule shaft as a non-linear function thereof and which non-linear movement is transmitted to said pointer means.

References Cited by the Examiner

UNITED STATES PATENTS

| | | | |
|---|---|---|---|
| 2,424,511 | 7/1947 | Stanley | 73—182 |
| 2,706,407 | 4/1955 | Hosford | 73—182 |
| 2,807,958 | 10/1957 | Anastasia | 73—178 |
| 3,104,546 | 9/1963 | Hauptman | 73—178 |
| 3,168,827 | 2/1965 | Bailey et al. | 73—178 |

LOUIS R. PRINCE, *Primary Examiner.*

LEONARD FORMAN, *Examiner.*